Nov. 28, 1967   R. G. WILSON   3,355,573
COMBINATION OVEN

Filed Aug. 6, 1965   2 Sheets-Sheet 1

INVENTOR
ROBERT G. WILSON

INVENTOR.
ROBERT G. WILSON
BY
ATTORNEY

United States Patent Office 3,355,573
Patented Nov. 28, 1967

3,355,573
COMBINATION OVEN
Robert G. Wilson, 643 E. Faris Road,
Greenville, S.C. 29605
Filed Aug. 6, 1965, Ser. No. 477,856
5 Claims. (Cl. 219—396)

ABSTRACT OF THE DISCLOSURE

An insulated housing is provided which is preferably substantially enclosed having a first electrical heating means for cooking eatables carried in an upper portion of the housing. A rotary assembly is provided for supporting the eatables below such heating means. A recess is defined within a vertical wall opposite and adjacent the rotary assembly for containing second electrical heating means for cooking eatables for emitting heat into the oven while protecting same from drippings. The second heating means may be used for baking pastry and the first and second heating means may be used for barbecuing meat.

---

Figure 1:
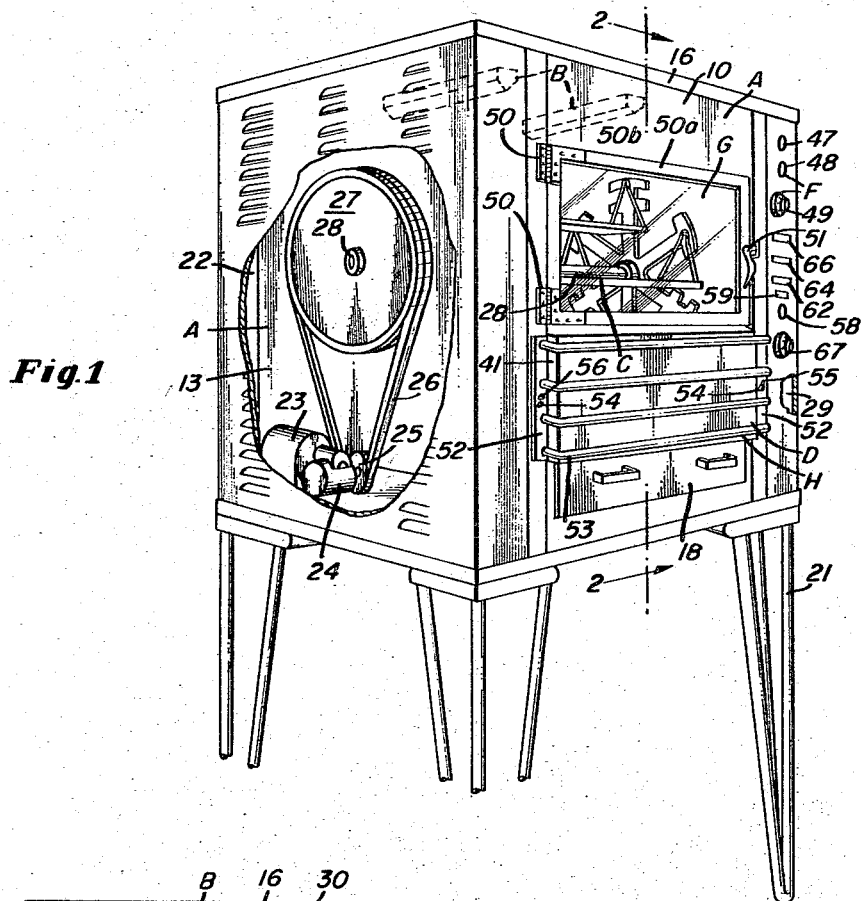

This invention relates to cooking ovens and more especially to an oven for commercial use for baking pastry and for barbecuing meat and the like.

The oven housing of the present invention is similar in some respects to that illustrated in Patent No. 2,722,882 issued Nov. 8, 1955 in the name of Robert G. Wilson, whereon for many years barbecue of excellent quality has been produced with relative ease. The rotary assembly of the present device may be similar to the one shown in the above patent or, as illustrated, the rotary assembly may preferably be of that type shown in copending application Ser. No. 277,411, filed Apr. 29, 1963 in the name of Charles M. Vaughan, now Patent No. 3,232,347. When barbecuing it is desirable to have heat which is conducive to the browning of meat, especially chickens and the like. It is also desirable to have a uniform heat throughout the oven. When baking pies, for example, relatively even heat is especially important and such heat should come from the bottom of the oven so as not to burn the pastry coverings for the pies. Former devices have positioned heaters in the bottom portion of the oven unprotected from falling juices. Efforts have been made to use shields or baffles to prevent drippings from falling on the heating elements but such have proved ineffective to avoid fouling the heating elements or creating deposits which are difficult to clean. In such former devices drippings have caused fires within the oven. Devices having heat positioned only at the top tend to burn pie crusts and the like. However, it is desirable that heat be positioned at the top when barbecuing so that juices emitted from the meat when passing the upper heating means will have a self-basting effect upon the eatable being cooked. While quartz heating elements have proved effective when positioned in the top of an oven for barbecuing and provide a source of light for display purposes, such are not the best for browning chickens and the like. It is also desirable that Calrod units be employed for the purpose of browning meat, especially chickens, and that the glass doors be relatively free from moisture for the sake of appearance. It has been found that cooking eatables displayed upon rotary members are especially attractive to purchasers and lead to greatly increased sales of such eatables so that the effectiveness of the display is of prime importance.

Accordingly, it is an important object of this invention to provide a combination oven having a rotary assembly for baking pastry and for barbecuing meat wherein lower heating elements are provided for even temperature and wherein such heating elements are protected from juices as might be dripping from pies and meat.

Another important object of the invention is to provide such a combination oven wherein heating means producing heat and light are provided in the top portion of the oven to provide self-basting for the meat and avoidance of meat shrinkage.

Another object of the invention is to provide a substantially airtight oven having heating means which may be used selectively positioned at the top and bottom portions thereof.

Another important object of the invention is to provide a heating unit as may be conducive to the browning of meat or for cooking pies positioned in the lower portion of the oven below a glass door maintaining a relatively even oven temperature while preventing the collection of excess moisture upon the oven door.

Still another important object of the invention is to provide a commercial oven with a rotary assembly providing a clear brilliantly illuminated eatable display while cooking with heat conducive to browning and which may be easily cleaned.

The construction designed to carry out the invention will be hereinafter described, together with other features thereof.

Figure 2:
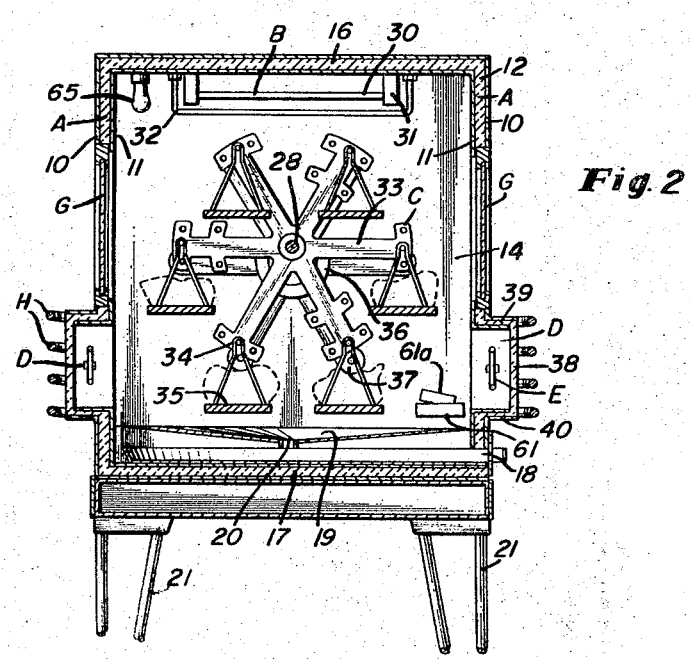
Figure 3:
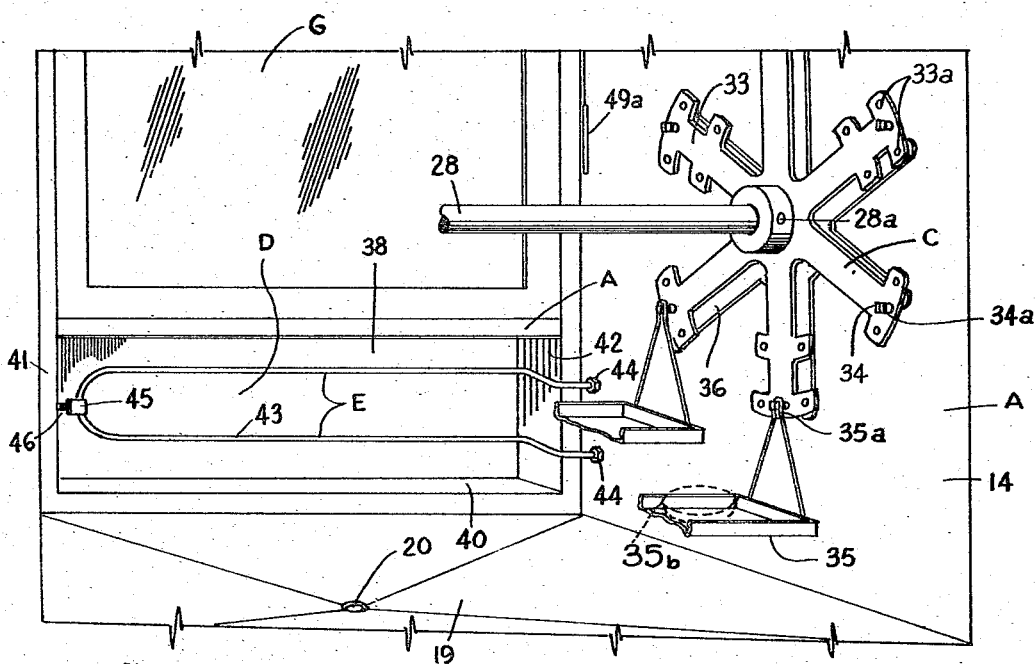
Figure 4:
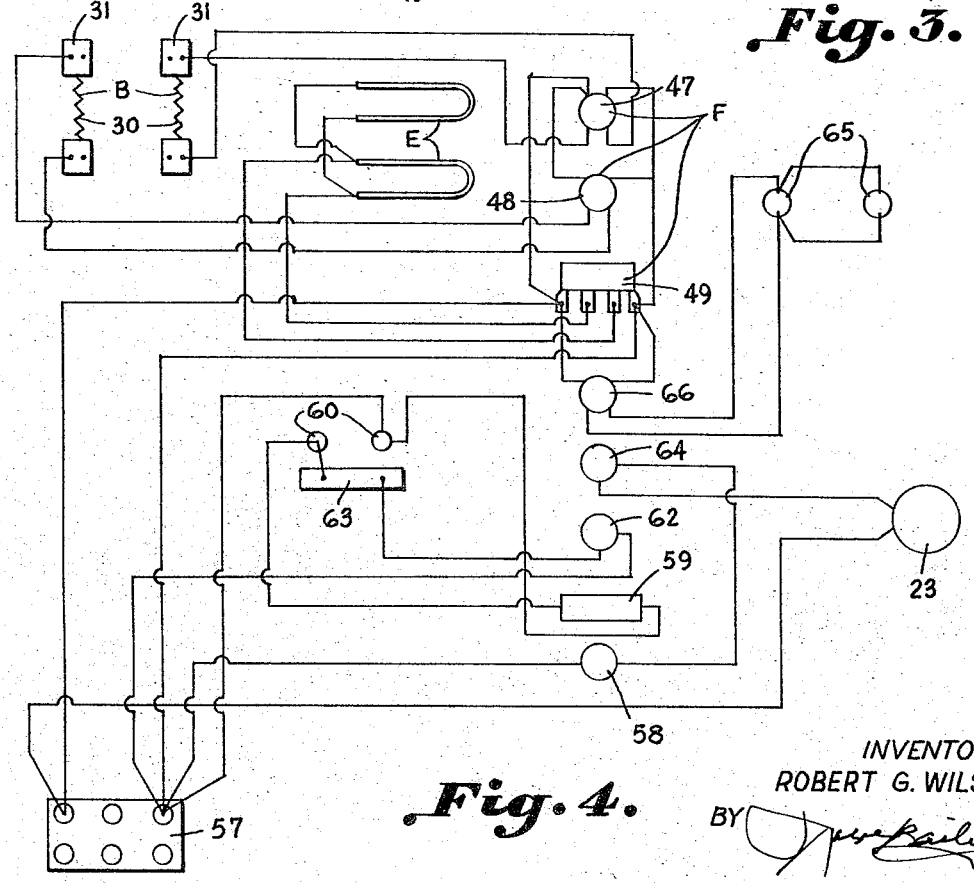

The invention will be more readily understood from a reading of the following specification and by reference to the accompanying drawings forming a part thereof, wherein an example of the invention is shown and wherein:

FIGURE 1 is a perspective view illustrating a combination oven constructed in accordance with the present invention, FIGURE 2 is a transverse sectional elevation taken on the line 2—2 in FIGURE 1, FIGURE 3 is an enlarged perspective view looking toward the inside of the rear right-hand corner of the oven, illustrated in FIGURE 1, and FIGURE 4 is a schematic diagram illustrating the electrical components of the device constructed in accordance with the present invention.

The drawings illustrate a combination oven for baking pastry and the like and for barbecuing meat and the like wherein an insulated housing, having substantially vertical front and rear walls A joined by vertical side walls, defines an oven. First electrical heating means B, preferably including a quartz heating element, is mounted within the top portion of the housing for producing light and heat. A driven rotary supporting assembly for eatables C is carried for rotation about a horizontal axis within the housing below the electrical heating means. A recess D is defined within the wall portion opposite and adjacent the rotary eatable supporting assembly, the recess opening into the oven. Second electrical heating means E, preferably including a Calrod heating element, is carried within the recess for emitting heat directly into the oven while being protected from drippings from the eatables for browning meat and baking pastry. Switch means F is provided for controlling operation of the first and second electrical heating means selectively so that the second heating means may be used singly for baking pastry and the first and second heating means may be used for barbecuing meat. The wall portion A has a glass door G carried above the second electrical heating means so as to avoid the collection of moisture on the glass door. A portion of the side wall portion is offset outwardly of the oven to define the recess D and a guard H is positioned over the outside of the offset portion to avoid contact by persons with the offset portion.

The insulated housing includes the vertical side walls A which have outer sheet metal portions 10 and inner sheet metal portions 11 with suitable insulation 12, such as fiberglass, therebetween. The housing includes similarly constructed insulated side wall portions 13 and 14 and a similarly constructed insulated top 16. The housing also has an insulated bottom portion 17 and a drawer 18, for collecting drippings from the eatables being cooked, positioned thereon. The sheet metal bottom portion 19 tapers downwardly toward the middle to permit drippings from the eatables to pour through a central hole 20 into the removable drawer 18.

A base support including suitable legs 21 may be provided for supporting the insulated oven housing. A compartment 22 is provided on the left-hand side of the housing for accommodating a motor 23 which through suitable gearing 24 drives a power take-off pulley 25. The pulley 25 drives a belt 26 which in turn drives an enlarged sheave 27. The sheave is carried by a central shaft 28 of the rotary assembly C. A compartment 29 is carried by the right-hand side portion of the insulated housing for carrying the various switch gear described below.

Tht first electrical heating means B preferably includes a pair of quartz heating elements 30, each of which is provided with the usual end support 31. A U-shaped metal guard 32, extending about the heating elements, is provided to protect each of the quartz elements 30 from accidental contact by eatables or by persons operating the machine. Thus, the quartz elements 30 are capable of producing both heat for cooking the eatables carried by the rotatable assembly C and provides light for displaying the interior of the insulated oven housing and its contents.

The driven rotary supporting assembly C includes a disc member 33 carried by the shaft 28 adjacent each end thereof within the oven. The disc rotatably carries spaced supports 34 each carrying one end of a longitudinally disposed depending tray 35. The other ends of the trays 35 (not shown) may be carried as illustrated in the copending application. An eccentrically mounted spider 36 is illustrated for maintaining the supports 34 in constantly vertical position, as illustrated in the copending application identified above, through the linkage 37. It will be observed that the disc 33 is secured to the shaft as by a setscrew 28a and that the supports 34 have complementary vertical sides 34a for engaging complementary side portions of the tray supports 35a for maintaining the trays 35 level at all times in a manner similar to that employed to maintain the trays level in the copending application. Pies 35b and the like, such as shown in broken lines, are carried in a level maner on the trays for baking by the second electrical heating means E. If preferred, spits may be employed in a manner such as set forth in the above patent and in the above application, or any other suitable rotary eatable supporting assembly having a central shaft with circumferentially spaced eatable supports may be employed such as those of my copending application, Ser. No. 332,223, filed Dec. 20, 1963. The spaced apertures 33a in the arms of the disc 33 are for accommodating spits if the user elects to use such rather than the trays illustrated.

The recesses D each includes an offset or back wall portion 38 which has upper and lower insulated wall connecting outwardly extending first and second flange portions 39 and 40, respectively, joined to the wall portions A. Insulated end wall connecting side flange portions 41 and 42 join the ends to the wall portions to form the recess D. Thus, the opening of the recess into the oven is positioned below the assembly C. The wall portion 38 is sufficiently offset to effectively avoid fouling the heating elements within the recesses by juices and meat drippings.

The second electrical heating means E each preferably includes a substantially U-shaped Calrod heating element 43 which is fastened at its free-ends by suitable fastening means including bolts 44 to the wall 14 of the oven housing. The portion of the Calrod element 43 opposite its free-ends may be welded to a bracket member 45 which carries a threaded element 46, threadably secured to the end wall 41 if the recess D. The heating means E is positioned directly below the doors, described below, and prevents condensation thereon. When barbecuing the heating means serves to brown the eatables and maintains an even temperature in the oven. When baking, the pies and the like are cooked from the bottom.

The switch means F includes a switch 47 and a switch 48 for each of the quartz heating elements B and a thermostat 49 for controlling the two oven Calrod units E. The bulb 49a of the thermostat is illustrated in the central portion of the rear right-hand corner of the oven so as to be exposed to mean oven temperatures. The switch means F may be used selectively so that either the first or second heating means may be used singly or so that both may be used together. It would be desirable to use the upper heating elements, preferably together with the lower heating elements when barbecuing, and the lower heating element singly when baking pastry. It may be desirable to use the upper heating elements alone for at least part of the barbecuing operation or for keeping cooked meat hot. In any case, complete versatility is afforded by the switch arrangement for upper and lower heating elements.

The wall portions A each have a glass door G carried by hinges 50. Means including a handle 51 is provided for opening and closing each of the doors G. The doors G each include a frame portion 50a and a glass 50b.

Each of the recesses D have a guard H positioned thereover to avoid contact by persons with the offset wall portions defining the recess D and to protect the offset portions. The guards H include a pair of vertical aligned end frame members 52 bridged by U-shaped bars 53 which are preferably hollow so as to be light in weight and to dissipate heat. Each of the frame members 52 have a vertical slot therein including an enlarged lower portion 54 and a smaller upper portion 55. An enlarged screw head 56 is suitably fixed to the insulated housing and is spaced outwardly therefrom sufficient to accommodate the frame members 52 between the enlarged portion thereof and the walls A. When positioning the guard H the screw heads are first placed through the enlarged portions 54 and then the guard portion is moved downwardly to confine the frame members 52 between the enlarged head 56 and the walls A.

Referring now to the circuit diagram illustrated in FIGURE 4, an outlet box 57 provides a source of electrical energy for the various electrical components. In addition to the electrical components described above, a circuit breaker 58 is provided as an overload protection for the motor 23. A pilot light 59 indicates when the heater 60 for the hickory smoke producing element 61 is energized. The Calrod heater 60 is energized through the switch 62 and is provided with a thermostat 63 for controlling the temperature thereof so as to cause the hickory 61a placed thereon to smoke but not ignite so as to flavor eatables during barbecuing. A switch 64 is provided for energizing the motor to turn the rotary assembly C during a cooking operation. A pair of oven lights 65 which are positioned in each of the rear upper corners of the oven housing are illustrated at 65 and are provided with a switch 66 for controlling same. It will be observed that a suitable mechanical timer, the indicator of which is illustrated at 67, may be provided within the right-hand compartment 29 to sound an alarm, such as a bell or buzzer, to indicate the completion of a cooking operation. If desired an electrical timer could be interposed in the circuit.

While a preferred embodiment of the invention has been described using specific terms, such description is for illustrative purposes only, and it is to be understood that changes and variations may be made without departing from the spirit or scope of the following claims.

What is claimed is:

1. A combination oven for baking pastry and for barbecuing meat and the like including, an insulated substantially enclosed housing having a substantially vertical oven wall portion, first electrical heating means for cooking mounted within an upper portion of the housing, a driven rotary supporting assembly for eatables carried for rotation about a horizontal axis within the housing below said electrical heating means, a recess defined within said wall portion opposite and adjacent said rotary eatable supporting assembly, said recess opening into the oven, second electrical heating means for cooking carried within said recess for emitting heat directly into the oven while being protected from drippings from the eatables, and switch means controlling operation of said first and second electrical heating means selectively, whereby said second heating means may be used for baking pastry and said first and second heating means may be used for barbecuing meat.

2. The structure set forth in claim 1, wherein said first electrical heating means includes a quartz heating element and the like for producing light and heat, and wherein said second electrical heating means includes a Calrod heating element and the like for browning meat and baking pastry.

3. The structure set forth in claim 1, wherein said vertical wall portion has a glass door carried therein above said recess adjacent said second electrical heating means, whereby collection of moisture on the glass door is avoided.

4. The structure set forth in claim 1, wherein a portion of said wall portion is offset outwardly of the oven to form the recess within the oven, and wherein a guard carried by the housing extends over the outside of said offset portion for avoiding contact by persons with the offset portion.

5. A combination oven for baking pastry and for barbecuing meat and the like including, an insulated housing defining the oven having a substantially vertical front wall portion and a substantially vertical rear wall portion therein, first electrical heating means mounted within a top portion of the housing, said first electrical heating means includes a quartz heating element for producing light and heat, a driven rotary supporting assembly for eatables carried for rotation within the housing below said electrical heating means, said front wall portion having a glass door carried therein and an opening below said door within said front wall, a first outwardly extending flange connected to the top of said front wall defining said opening, a second outwardly extending flange connected to the bottom of said front wall defining said opening, side flanges extending outwardly from opposite sides of said front wall defining said opening having their tops attached to respective ends of said first flange and their bottoms connected to corresponding respective ends of said second flange, a back wall connected to said first and second flanges and said side flanges defining an oven compartment opening into said oven, second electrical heating means carried within said compartment for emitting heat directly into the oven while being protected from drippings from the eatables, said second electrical heating means including a Calrod heating element for browning meat and baking pastry, said vertical rear wall of said housing having an opening therein with flanges extending outwardly and a back wall defining a second compartment corresponding to the compartment in said front wall, said second electrical heating means including an electrical heating means comprising a Calrod heating element carried within said second compartment for emitting heat directly into the oven while being protected from drippings from the eatables, and switch means controlling operation of said electrical heating means selectively, whereby said second heating means may be used for baking pastry and said first and second heating means may be used for barbecuing meat.

References Cited
UNITED STATES PATENTS

| | | | |
|---|---|---|---|
| 2,470,645 | 5/1949 | Reichart | 99—421 |
| 2,701,516 | 2/1955 | Dorsey | 99—421 |
| 2,722,882 | 11/1955 | Wilson | 99—421 |
| 3,214,566 | 10/1965 | Wilson | 219—400 |
| 3,232,247 | 2/1966 | Vaughan | 107—59 |

RICHARD M. WOOD, *Primary Examiner.*

C. L. ALBRITTON, *Assistant Examiner.*